United States Patent
Tuttle (10) Patent No.: US 8,134,452 B2
(45) Date of Patent: Mar. 13, 2012

(54) METHODS AND SYSTEMS OF RECEIVING DATA PAYLOAD OF RFID TAGS

(75) Inventor: John R Tuttle, Boulder, CO (US)

(73) Assignee: Round Rock Research, LLC, Mt. Kisco, NY (US)

( * ) Notice: Subject to any disclaimer, the term of this patent is extended or adjusted under 35 U.S.C. 154(b) by 917 days.

(21) Appl. No.: 11/755,073

(22) Filed: May 30, 2007

(65) Prior Publication Data

US 2008/0297324 A1    Dec. 4, 2008

(51) Int. Cl.
*G08B 21/00* (2006.01)
(52) U.S. Cl. ............... 340/10.2; 340/10.1; 340/10.3; 340/10.32; 340/10.33
(58) Field of Classification Search ............... 340/10.1, 340/10.2, 10.3, 10.32, 10.33
See application file for complete search history.

(56) References Cited

U.S. PATENT DOCUMENTS

| | | | |
|---|---|---|---|
| 4,075,632 A | 2/1978 | Baldwin et al. |
| 4,761,778 A | 8/1988 | Hui |
| 4,796,023 A | 1/1989 | King |
| 4,799,059 A | 1/1989 | Grindahl et al. |
| 4,845,504 A | 7/1989 | Roberts et al. |
| 4,862,453 A | 8/1989 | West et al. |
| 4,926,182 A | 5/1990 | Ohta et al. |
| 4,955,018 A | 9/1990 | Twitty et al. |
| 4,969,146 A | 11/1990 | Twitty et al. |
| 5,019,813 A | 5/1991 | Kip et al. |
| 5,025,486 A | 6/1991 | Klughart |
| 5,046,066 A | 9/1991 | Messenger |
| 5,055,968 A | 10/1991 | Nishi et al. |
| 5,121,407 A | 6/1992 | Partyka et al. |
| 5,124,697 A | 6/1992 | Moore |
| 5,142,694 A | 8/1992 | Jackson et al. |
| 5,144,313 A | 9/1992 | Kirknes |
| 5,144,668 A | 9/1992 | Malek et al. |
| 5,150,114 A | 9/1992 | Johansson |
| 5,150,310 A | 9/1992 | Greenspun et al. |
| 5,164,985 A | 11/1992 | Nysen et al. |
| 5,168,510 A | 12/1992 | Hill |

(Continued)

FOREIGN PATENT DOCUMENTS

EP        779520        9/1997

(Continued)

OTHER PUBLICATIONS

Transaction History of related U.S. Appl. No. 09/026,043, filed Feb. 19, 1998, entitled "Method of Addressing Messages and Communications System," now U.S. Patent No. 6,118,789.

(Continued)

*Primary Examiner* — Jennifer Mehmood
*Assistant Examiner* — Mark Rushing
(74) *Attorney, Agent, or Firm* — Lerner, David, Littenberg, Krumholz & Mentlik, LLP (57) ABSTRACT

Methods and systems of receiving data payload of RFID tags. At least some of the illustrative embodiments are methods comprising selecting (by each of a plurality of radio frequency identification (RFID) tags) a time window within which to transmit (the selecting to create respective time windows), sending a start signal from a RFID reader to the plurality of RFID tags (the start signal indicative of the start of a first time window), and transmitting a signal by each of the plurality of RFID tags in the respective time windows.

26 Claims, 4 Drawing Sheets

U.S. PATENT DOCUMENTS

| | | | |
|---|---|---|---|
| 5,194,860 A | 3/1993 | Jones et al. | |
| 5,231,646 A | 7/1993 | Heath et al. | |
| 5,266,925 A | 11/1993 | Vercellotti et al. | |
| 5,307,463 A | 4/1994 | Hyatt et al. | |
| 5,365,551 A | 11/1994 | Sondgrass et al. | |
| 5,373,503 A | 12/1994 | Chen | |
| 5,449,296 A | 9/1995 | Jacobsen et al. | |
| 5,461,627 A | 10/1995 | Rypinski | |
| 5,479,416 A | 12/1995 | Snodgrass et al. | |
| 5,500,650 A | 3/1996 | Snodgrass et al. | |
| 5,530,702 A | 6/1996 | Palmer et al. | |
| 5,550,547 A | 8/1996 | Chan et al. | |
| 5,583,850 A | 12/1996 | Snodgrass et al. | |
| 5,608,739 A | 3/1997 | Snodgrass et al. | |
| 5,619,648 A | 4/1997 | Canale et al. | |
| 5,621,412 A | 4/1997 | Sharpe et al. | |
| 5,625,628 A | 4/1997 | Heath | |
| 5,627,544 A | 5/1997 | Snodgrass et al. | |
| 5,640,151 A | 6/1997 | Reis et al. | |
| 5,649,296 A | 7/1997 | MacLellan et al. | |
| 5,686,902 A | 11/1997 | Reis et al. | |
| 5,751,570 A * | 5/1998 | Stobbe et al. | 700/11 |
| 5,790,946 A | 8/1998 | Rotzoll | |
| 5,805,586 A | 9/1998 | Perreault et al. | |
| 5,841,770 A | 11/1998 | Snodgrass et al. | |
| 5,914,671 A | 6/1999 | Tuttle | |
| 5,936,560 A | 8/1999 | Higuchi | |
| 5,940,006 A | 8/1999 | MacLellan et al. | |
| 5,942,987 A | 8/1999 | Heinrich et al. | |
| 5,952,922 A | 9/1999 | Shober | |
| 5,966,471 A | 10/1999 | Fisher et al. | |
| 5,974,078 A | 10/1999 | Tuttle et al. | |
| 5,988,510 A | 11/1999 | Tuttle et al. | |
| 6,038,455 A | 3/2000 | Gardner et al. | |
| 6,061,344 A | 5/2000 | Wood, Jr. | |
| 6,072,801 A | 6/2000 | Wood, Jr. et al. | |
| 6,075,973 A | 6/2000 | Greeff et al. | |
| 6,097,292 A | 8/2000 | Kelly et al. | |
| 6,104,333 A | 8/2000 | Wood, Jr. | |
| 6,118,789 A | 9/2000 | Wood, Jr. | |
| 6,130,602 A | 10/2000 | O'Toole et al. | |
| 6,130,623 A * | 10/2000 | MacLellan et al. | 340/5.1 |
| 6,150,921 A | 11/2000 | Werb et al. | |
| 6,157,633 A | 12/2000 | Wright | |
| 6,169,474 B1 | 1/2001 | Greeff et al. | |
| 6,177,858 B1 | 1/2001 | Raimbault et al. | |
| 6,185,307 B1 | 2/2001 | Johnson, Jr. | |
| 6,192,222 B1 | 2/2001 | Greeff et al. | |
| 6,216,132 B1 | 4/2001 | Chandra et al. | |
| 6,226,300 B1 | 5/2001 | Hush et al. | |
| 6,229,987 B1 | 5/2001 | Greeff et al. | |
| 6,243,012 B1 | 6/2001 | Shober et al. | |
| 6,265,962 B1 | 7/2001 | Black et al. | |
| 6,265,963 B1 | 7/2001 | Wood, Jr. | |
| 6,275,476 B1 * | 8/2001 | Wood, Jr. | 370/312 |
| 6,282,186 B1 | 8/2001 | Wood, Jr. | |
| 6,288,629 B1 | 9/2001 | Cofino et al. | |
| 6,289,209 B1 | 9/2001 | Wood, Jr. | |
| 6,307,847 B1 | 10/2001 | Wood, Jr. | |
| 6,307,848 B1 | 10/2001 | Wood, Jr. | |
| 6,324,211 B1 | 11/2001 | Ovard et al. | |
| 6,415,439 B1 | 7/2002 | Randell et al. | |
| 6,459,726 B1 | 10/2002 | Ovard et al. | |
| 6,483,427 B1 | 11/2002 | Werb | |
| 6,566,997 B1 | 5/2003 | Bradin | |
| 6,570,487 B1 | 5/2003 | Steeves | |
| 6,707,376 B1 | 3/2004 | Patterson et al. | |
| 6,714,559 B1 | 3/2004 | Meier | |
| 6,771,634 B1 | 8/2004 | Wright | |
| 6,778,096 B1 | 8/2004 | Ward et al. | |
| 6,784,787 B1 | 8/2004 | Atkins | |
| 6,850,510 B2 | 2/2005 | Kubler et al. | |
| 6,919,793 B2 | 7/2005 | Heinrich et al. | |
| 7,026,935 B2 | 4/2006 | Diorio et al. | |
| 7,315,522 B2 | 1/2008 | Wood, Jr. | |
| 7,385,477 B2 | 6/2008 | O'Toole et al. | |
| 7,672,260 B2 | 3/2010 | Wood, Jr. | |
| 2003/0072322 A1 * | 4/2003 | Collins et al. | 370/445 |
| 2003/0235184 A1 | 12/2003 | Dorenbosch | |
| 2005/0060069 A1 | 3/2005 | Breed et al. | |
| 2005/0207364 A1 | 9/2005 | Wood, Jr. | |
| 2005/0242927 A1 * | 11/2005 | Friedrich | 340/10.2 |
| 2006/0022800 A1 | 2/2006 | Krishna et al. | |
| 2006/0022801 A1 | 2/2006 | Husak et al. | |
| 2006/0022815 A1 | 2/2006 | Fischer et al. | |
| 2006/0056325 A1 | 3/2006 | Wood, Jr. | |
| 2006/0209781 A1 | 9/2006 | Wood, Jr. | |
| 2007/0139164 A1 | 6/2007 | O'Toole et al. | |
| 2007/0176751 A1 | 8/2007 | Cesar et al. | |
| 2008/0007412 A1 | 1/2008 | Wood, Jr. | |
| 2008/0042806 A1 | 2/2008 | Wood, Jr. | |
| 2008/0048832 A1 | 2/2008 | O'Toole et al. | |
| 2008/0048835 A1 | 2/2008 | O'Toole et al. | |
| 2008/0129485 A1 | 6/2008 | Tuttle | |
| 2008/0180221 A1 | 7/2008 | Tuttle | |
| 2009/0322491 A1 | 12/2009 | Wood, Jr. | |

FOREIGN PATENT DOCUMENTS

| | | |
|---|---|---|
| EP | 1072128 | 5/2008 |
| JP | 9054213 | 2/1997 |
| JP | 2002228809 | 8/2002 |
| WO | 9748216 | 12/1997 |
| WO | 9943127 | 8/1999 |
| WO | 2008094728 | 8/2008 |

OTHER PUBLICATIONS

Transaction History of related U.S. Appl. No. 09/026,045, filed Feb. 19, 1998, entitled "Method of Addressing Messages, Methods of Establishing Wireless Communications, and Communications System," now U.S. Patent No. 6,072,801.

Transaction History of related U.S. Appl. No. 09/026,050, filed Feb. 19, 1998, entitled "Method of Addressing Messages and Communications System," now U.S. Patent No. 6,061,344.

Transaction History of related U.S. Appl. No. 09/026,248, filed Feb. 19, 1998, entitled "Method of Addressing Messages and Communications System," now U.S. Patent No. 6,275,476.

Transaction History of related U.S. Appl. No. 09/551,304, filed Apr. 18, 2000, entitled "Method of Addressing Messages and Communications Systems," now U.S. Patent No. 6,282,186.

Transaction History of related U.S. Appl. No. 09/556,235, filed Apr. 18, 2000, entitled "Method of Addressing Messages, and Establishing Communications Using a Tree Search Technique That Skips Levels," now U.S. Patent No. 6,226,300.

Transaction History of related U.S. Appl. No. 09/617,390, filed Jul. 17, 2000, entitled "Method of Addressing Messages and Communications System," now U.S. Patent No. 6,307,847.

Transaction History of related U.S. Appl. No. 09/773,461, filed Jan. 31, 2001, entitled "Method of Addressing Messages, Methods of Establishing Wireless Communications, and Communications System," now U.S. Patent No. 6,307,848.

Transaction History of related U.S. Appl. No. 09/820,467, filed Mar. 28, 2001, entitled "Method of Addressing Messages and Communications System," now U.S. Patent No. 7,315,522.

Transaction History of related Transaction History of related U.S. Appl. No. 10/652,573, filed Aug. 28, 2003, entitled "Method of Addressing Messages and Communications System."

Transaction History of related U.S. Appl. No. 10/693,696, filed Oct. 23, 2003, entitled "Method and Apparatus to Select Radio Frequency Identification Devices in Accordance with an Arbitration Scheme."

Transaction History of related U.S. Appl. No. 10/693,697, filed Oct. 23, 2003, entitled "Method of Addressing Messages, Methods of Establishing Wireless Communications, and Communications System."

Transaction History of related U.S. Appl. No. 11/143,395, filed Jun. 1, 2005, entitled "Method of Addressing Messages and Communications System."

Transaction History of related U.S. Appl. No. 11/270,204, filed Nov. 8, 2005, entitled "Method of Addressing Messages and Communications System."

Transaction History of related U.S. Appl. No. 11/416,846, filed May 2, 2006, entitled "Method of Addressing Messages and Communications System."

Transaction History of related U.S. Appl. No. 11/700,525, filed Jan. 30, 2007, entitled "Systems and Methods for RFID Tag Arbitration."
Transaction History of related U.S. Appl. No. 11/855,855, filed Sep. 14, 2007, entitled "Method of Addressing Messages and Communications System."
Transaction History of related U.S. Appl. No. 11/855,860, filed Sep. 14, 2007, entitled "Method of Addressing Messages and Communications System."
Transaction History of related U.S. Appl. No. 11/859,360, filed Sep. 21, 2007, entitled "Method of Addressing Messages and Communications System."
Transaction History of related U.S. Appl. No. 11/859,364, filed Sep. 21, 2007, entitled "Method of Addressing Messages and Communications System."
Transaction History of related U.S. Appl. No. 11/862,121, filed Sep. 26, 2007, entitled "Method of Addressing Messages and Communications System."
Transaction History of related U.S. Appl. No. 11/862,124, filed Sep. 26, 2007, entitled "Method of Addressing Messages and Communications."
Transaction History of related U.S. Appl. No. 11/862,130, filed Sep. 26, 2007, entitled "Method of Addressing Messages and Communications System."
Transaction History of related U.S. Appl. No. 11/865,580, filed Oct. 1, 2007, entitled "Method of Addressing Messages, Methods of Establishing Wireless Communications, and Communications System."
Transaction History of related U.S. Appl. No. 11/865,584, filed Oct. 1, 2007, entitled "Method of Addressing Messages, Methods of Establishing Wireless Communications, and Communications System."
Wood, Jr., Clifton W., Reissue U.S. Appl. No. 12/493,542, filed Jun. 29, 2009.
Wood, Jr., Clifton W., Reissue U.S. Appl. No. 12/541,882, filed Aug. 14, 2009.
Auto-ID Center, Massachusetts Institute of Technology, "13.56 MHz ISM Band Class 1 Radio Frequency Identification Tag Interface Specification: Recommended Standard," Technical Report, Feb. 1, 2003.
Capetanakis, John I., "Generalized TDMA: The Multi-Accessing Tree Protocol," IEEE Transactions on Information Theory, vol. Com. 27, No. 10, pp. 1476-1484, Oct. 1979.
Capetanakis, John I., "Tree Algorithms for Packet Broadcast Channels", IEEE Transactions on Information Theory, vol. IT-25, No. 5, pp. 505-515, Sep. 1979.
CNN Money, "Manhattan Associates Announces Next-Generation Microsoft-Based RFID Solutions," located at http:// money.cnn.com/services/tickerheadlines/prn/cItu045.PI.09162003122727.24911.htm, Sep. 16, 2003.
Engels, Daniel, "The Use of the Electronic Product Code," Auto-ID Center, Massachusetts Institute of Technology, Technical Report, Feb. 1, 2003.
EPC Global, Inc. "EPC Radio Frequency Identity Protocols—Class-1 Generation-2 UHF RFID—Protocol for Communications at 860 MHz-960MHz," version 1.0.9, cover sheet and pp. 37-38, Jan. 2005.
eRetailNews, "The Electronic Product Code (EPC)—A Technology Revolution?" located at http://www.eretailnews.com/features/0105epc1.htm, accessed Oct. 15, 2003.
eRetailNews, "The Electronic Product Code (EPC)," located at http://www.eretailnews.com/features/epc/htm, accessed Oct. 15, 2003.
eRetailNews, "The Electronic Product Code Schematic," located at http://eee.eretailnews.com/features/0105epcschema.htm, accessed Oct. 15, 2003.
Extended Search Report and Search Opinion for EP Patent Application No. 05016513.3, Jan. 22, 2007.
Extended Search Report and Search Opinion for EP Patent Application No. 05016514.1, Jan. 26, 2007.
Finkenzeller, Klaus, "Radio Frequency Idenitifcation—The Authors Homepage of the RFID Handbook," located at http://www.rfid-handbook.com, accessed Feb. 22, 2007.
High Tech Aid, "ISO/IEC 18000—RFID Air Interface Standards," located at http://www.hightechaid.com/standards/18000.htm, Feb. 1, 2003.
Humblet, Pierre A. et al., "Efficient Accessing of a Multiaccess Channel," Proceedings of the 19th IEEE Conference on Decision and Control including the Symposium on Adaptive Processes, pp. 624-627, 1980.
International Application No. PCT/US08/50630, International Search Report, Jun. 27, 2008.
International Application No. PCT/US08/50630, Written Opinion, Jun. 27, 2008.
International Application No. PCT/US99/02288, International Search Report, Aug. 3, 1999.
International Application No. PCT/US99/02288, Written Opinion, Jan. 27, 2000.
ISO/IEC, "Automatic Identification—Radio Frequency Identification for Item Management—Communications and Interfaces—Part 3: Physical Layer, Anti Collision System and Protocol Values at 13.56 MHz Mode 4," ISO/IEC 18000-3-4, Mar. 1, 2001.
ISO/IEC, "Automatic Identification—Radio Frequency Identification for Item Management—Communications and Interfaces—Part 3: Physical Layer, Anti-Collision System and Protocol Values at 13.56 MHz Mode 1," ISO/IEC 18000-3-1, Mar. 1, 2001.
ISO/IEC, "Identification Cards—Contactless Integrated Circuit(s) Cards—Proximity Cards—Part 1: Physical Characteristics," ISO/IEC FCD 14443-1, 1997.
ISO/IEC, "Identification Cards—Contactless Integrated Circuit(s) Cards—Proximity Cards—Part 2: Radio Frequency Power and Signal Interface," ISO/IEC FCD 14443-2, Mar. 26, 1999.
ISO/IEC, "Identification Cards—Contactless Integrated Circuit(s) Cards—Proximity Cards—Part 3: Initiation and Anticollision," ISO/IEC FDIS 14443-3:2000(E), Jul. 13, 2000.
ISO/IEC, "Identification Cards—Contactless Integrated Circuit(s) Cards—Proximity Cards—Part 4: Transmission Protocol," ISO/IEC FDIS 14443-4:2000(E), Jul. 13, 2000.
ISO/IEC, "Identification Cards—Contactless Integrated Circuit(s) Cards—Vicinity Cards—Part 1: Physical Characteristics," ISO/IEC FDIS 15693-1:2000(E), May 19, 2000.
ISO/IEC, "Identification Cards—Contactless Integrated Circuit(s) Cards—Vicinity Cards—Part 2: Interface and Initialization," ISO/IEC FDIS 15693-2:2000(E), Feb. 3, 2000.
ISO/IEC, "Identification Cards—Contactless Integrated Circuit(s) Cards—Vicinity Cards—Part 3: Anitcollision and Transmission Protocol," ISO/IEC CD 15693-3:1999(E), Nov. 17, 1999.
ISO/IEC, "Information Technology AIDC Techniques—RFID for Item Management—Air Interface—Part 3: Paramenters for Air Interface Communications at 13.56 MHz," ISO/IEC 18000-3 FCD, May 27, 2002.
Mullin, Eileen, "Electronic Product Code," Baseline Magazine, located at www.baselinemag.com/article2/0,3959,655991,00.asp, Sep. 5, 2002.
RFID Journal, "Second Source of Class 1 EPC Chips," located at http://www.rfidjournal.com/article/articleview/473/1/1/, Jun. 26, 2003.
Smart Active Labels Consortium, organization homepage located at http://www.sal-c.org, accessed Feb. 22, 2007.
Symbol Technologies, Inc., "Understanding Gen 2: What It Is, How You Will Benefit and Criteria for Vendor Assessment," white paper, Jan. 2006.
Wolf, Jack Keil, "Principles of Group Testing and an Application to the Design and Analysis of Multi-Access Protocols," NATO ASI Series E, Applied Sciences, No. 91, pp. 237-257, 1985.
Wood, Jr., Clifton W., Reissue U.S. Appl. No. 10/652,573, filed Aug. 28, 2008.
Wood, Jr., Clifton W., Reissue U.S. Appl. No. 10/693,696, filed Oct. 23, 2003.
Wood, Jr., Clifton W., Reissue U.S. Appl. No. 10/693,697, filed Oct. 23, 2003.
Wood, Jr., Clifton W., Reissue U.S. Appl. No. 11/859,360, filed Sep. 21, 2007.
Wood, Jr., Clifton W., Reissue U.S. Appl. No. 11/859,364, filed Sep. 21, 2007.

Wood, Jr., Clifton W., Reissue U.S. Appl. No. 11/862,121, filed Sep. 26, 2007.

Wood, Jr., Clifton W., Reissue U.S. Appl. No. 11/862,124, filed Sep. 26, 2007.

Wood, Jr., Clifton W., Reissue U.S. Appl. No. 11/862,130, filed Sep. 21, 2007.

Wood, Jr., Clifton W., Reissue U.S. Appl. No. 11/865,580, filed Oct. 1, 2007.

Wood, Jr., Clifton W., Reissue U.S. Appl. No. 11/865,584, filed Oct. 1, 2007.

Wright, Jim, "Trends and Innovations in RF Indentification," SUN Microsystems Inc. presentation, Mar. 2005.

Zebra Technologies Corporation, "Electronic Product Code (EPC)," located at http://www.rfid.zebra.com/epc/htm, accessed Oct. 15, 2003.

* cited by examiner

FIG.5

METHODS AND SYSTEMS OF RECEIVING DATA PAYLOAD OF RFID TAGS

BACKGROUND

1. Field

At least some of the various embodiments are directed to radio frequency identification (RFID) readers and RFID tags utilizing a reduced number of interactions for the RFID reader to acquire some or all of the data payload of the RFID tags.

2. Description of the Related Art

In many circumstances a RFID reader may be in the presence of a plurality of RFID tags; however, the data payload of RFID tags is broadcast from the RFID tags one at a time to ensure the transmissions do not collide. In conventional systems the RFID reader and RFID tags perform a series of communications to isolate a single RFID tag (also known as selecting or singulating the RFID tag) to which the RFID reader then directly communicates to acquire the data payload of the tag. One such conventional system is Radio-Frequency Identity Protocols Class-1, Generation-2 UHF RFID Version 1.0.9 (also known as the EPCglobal RFID Air Interface) promulgated by EPCglobal Inc. Under the illustrative RFID Air Interface protocol, selecting a RFID tag involves the RFID reader broadcasting a "Query" command, which forces each RFID tag in communication range to generate a random slot counter value and to place the slot counter value in a register. Under this protocol a RFID tag may only communicate if its slot counter value is zero; thus, the RFID reader communicates with the RFID tag (if any) whose slot counter value is zero. Once communication with the RFID tag is complete, or if no RFID tag has a slot counter value of zero, the RFID reader issues a "QueryRep" command. Upon receipt of a "QueryRep" command, each RFID tag decrements its respective slot counter value and the process continues with the RFID tag (if any) that has a slot counter value of zero.

With respect to the RFID Air Interface protocol, consider as an example a situation where two RFID tags exist within the transmission range of a RFID reader. The RFID reader issues a "Query" command, which forces each RFID tag to generate a random number (between zero and three in this example), and places the number in its slot counter register. Further consider that a first RFID tag, after random number generation, has slot counter value of one and the second RFID tag has a slot counter value of two. Because neither RFID tag has a slot counter value of zero, neither RFID tag communicates to the RFID reader. The RFID reader, in turn, issues a "QueryRep" command, which forces the RFID tags to decrement their slot counter values. After the "QueryRep" command, the first RFID tag has slot counter value of zero, and the second RFID tag has slot counter value of one. The first RFID tag broadcasts a tag identifier (e.g. a 16 bit random number, which may also be referred to as a "handle" or "RN16"). The RFID reader returns an acknowledgement (by returning the tag identifier), and the first RFID tag then transmits some or all of the data payload (e.g. electronic product code or other data stored in the tag memory). At further command of the RFID reader, the first RFID tag may resend some or all the data payload, transition to a disabled or "killed" state, or update data payload contents with data supplied by the RFID reader, just to name a few actions that can be performed with respect to the tag. Once communication with the first RFID tag is complete, the RFID reader again issues a "QueryRep" command, forcing the second RFID tag to decrement its slot counter value. After the second illustrative "QueryRep" command, the second RFID tag has a slot counter value of zero, and thus the second RFID tag has been singulated and the RFID reader may communicate with the second RFID tag.

As shown by the above illustration, the slot counter values are not time periods in which a RFID tag is to respond, but instead merely define an order in which the RFID tags will be read. Stated otherwise, though a RFID tag operated under the illustrative RFID Air Interface protocol may know its place in line as defined by the slot counter value, the particular time at which the RFID tag is to transmit is unknown as the time is subject to the number of actions the RFID reader may need to perform on each previous RFID tag, and the number of gaps in the slot counter values among the RFID tags.

The illustration above is based on two RFID tags and only four possible slot counter values. However, in some situations there may be hundreds of RFID tags within communication range of a reader, and the slot values under the illustrative RFID Air Interface protocol may span as many as 16 bits (i.e., 65,536 values). Moreover, the illustrative RFID Air Interface protocol also defines multiple inventory rounds (each round a separate session for communication) and use of "inventory flags" on a per-session basis. The possible inventory rounds and flags dictate further interaction between the RFID reader and the RFID tags to establish/verify the inventory round and assert/de-assert the inventory flags. Thus, the process of singulating and communicating with each and every RFID tag in a population of RFID tags may require several thousand interactions, and dictates significant complexity in the design of RFID tags, particularly the RFID circuits within the RFID tags.

BRIEF DESCRIPTION OF THE DRAWINGS

For a detailed description of various embodiments, reference will now be made to the accompanying drawings in which.

NOTATION AND NOMENCLATURE

Certain terms are used throughout the following description and claims to refer to particular system components. As one skilled in the art will appreciate, design and manufacturing companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other intermediate devices and connections. Moreover, the term "system" means "one or more components" combined together. Thus, a system can comprise an "entire system," "subsystems" within the system, a radio frequency identification (RFID) tag, a RFID reader, or any other device comprising one or more components.

DETAILED DESCRIPTION OF DISCLOSED EMBODIMENTS

Figure 1:
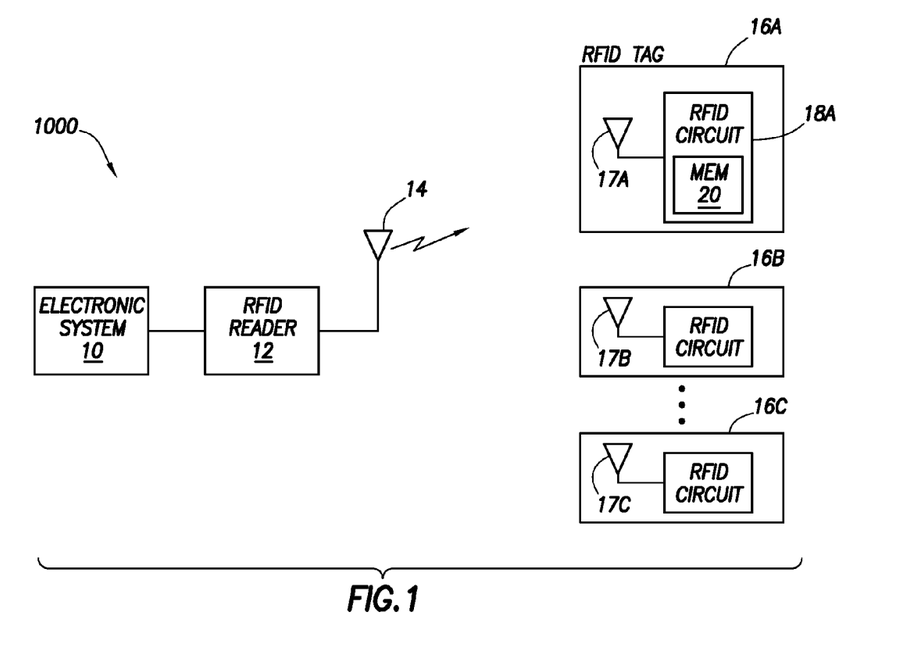
FIG. 1 shows a radio frequency identification (RFID) system in accordance with at least some embodiments.

FIG. 1 illustrates a system 1000 in accordance with at least some embodiments. In particular, system 1000 comprises an electronic system 10 (e.g. a computer system) coupled to a radio frequency identification (RFID) reader 12. The RFID reader 12 may be equivalently referred as an interrogator. By way of antenna 14, the RFID reader 12 communicates with one or more RFID tags 16A-16C proximate to the RFID reader (i.e., within communication range).

Considering a single RFID tag 16A (but the description equally applicable to all the RFID tags 16A-16C), RFID tag 16A comprises a tag antenna 17A which couples to an RFID circuit 18A. The RFID circuit 18A implements in hardware (or a combination of hardware and software) various state machines, microprocessors, logic or other circuits to enable the RFID circuit to receive signals from the RFID reader, and to respond to those signals in accordance with the various embodiments. The RFID circuit 18A further comprises a tag memory 20 within which the data payload of the RFID tag may be stored (e.g. an electronic product code, user defined data and kill passwords).

A communication sent by the RFID reader 12 is received by tag antenna 17A, and passed to the RFID circuit 18A. In response to the communication, the RFID circuit 18 transmits to the RFID reader 12 the response (e.g. the electronic product code, user defined data and kill passwords) using the tag antenna 17A, and the time window within which the response is transmitted selected as discussed below. The RFID reader 12 passes data obtained from the various RFID tags 16 to the electronic system 10, which performs any suitable function. For example, the electronic system 10, based on the data received from the RFID tags 16, may note the entrance of employees to a work location, direct a parcel identified by the RFID tag 16 down a particular conveyor system, or inventory products in a shopping cart for purposes of checkout and payment.

There are several types of RFID tags operable in the illustrative system 1000. For example, RFID tags may be active tags, meaning each RFID tag comprises its own internal battery or other power source. Using power from the internal power source, an active RFID tag monitors for signals from the RFID reader 12. When an interrogating signal directed to the RFID tag is sensed, the tag response may be tag-radiated radio frequency (RF) power (with a carrier modulated to represent the data or identification value) using power from the internal battery or power source. A semi-active tag may likewise have its own internal battery or power source, but a semi-active tag remains dormant (i.e., powered-off or in a low power state) most of the time. When an antenna of a semi-active tag receives an interrogating signal, the power received is used to wake or activate the semi-active tag, and a response (if any) comprising an identification value is sent by modulating the RF backscatter from the tag antenna, with the semi-active tag using power for internal operations from its internal battery or power source. In particular, the RFID reader 12 and antenna 14 continue to transmit power after the RFID tag is awake. While the RFID reader 12 transmits, the tag antenna 17 of the RFID tag 16 is selectively tuned and de-tuned with respect to the carrier frequency. When tuned, significant incident power is absorbed by the tag antenna 17. When de-tuned, significant power is reflected by the tag antenna 17 to the antenna 14 of the RFID reader 12. The data or identification value modulates the carrier to form the reflected or backscattered electromagnetic wave. The RFID reader 12 reads the data or identification value from the backscattered electromagnetic waves. Thus, in this specification and in the claims, the terms "transmitting" and "transmission" include not only sending from an antenna using internally sourced power, but also sending in the form of backscattered signals.

A third type of RFID tag is a passive tag, which, unlike active and semi-active RFID tags, has no internal battery or power source. The tag antenna 17 of the passive RFID tag receives an interrogating signal from the RFID reader, and the power extracted from the received interrogating signal is used to power the tag. Once powered or "awake," the passive RFID tag may accept a command, send a response comprising a data or identification value, or both; however, like the semi-active tag the passive tag sends the response in the form of RF backscatter.

The various embodiments are directed to systems comprising RFID readers and RFID tags utilizing a reduced number of interactions for the RFID reader to acquire the some or all of the data payload of the RFID tags. More particularly, the process of reading RFID tags in accordance with the various embodiments involves the RFID reader broadcasting an electromagnetic signal to all RFID tags in communication range. In response to the electromagnetic signal, each RFID tag randomly selects from a number of possible time windows within which to transmit its data payload. When their respective time windows arrive, and without further command from the RFID reader, each RFID tag transmits its data payload (and possibly error correction codes). When the number of possible time windows is greater than the number of RFID tags, it is statistically feasible that each RFID tag randomly selects a different time window, and only one reading session is used to read all the proximate RFID tags. In the event two or more tags randomly select the same window in a first reading session, the process of broadcasting an electromagnetic signal to the RFID tags, and receiving responses in respective time windows, may be repeated. Based on the two (or more) inventory sessions the entire population of RFID tags may be discovered.

Figure 2:
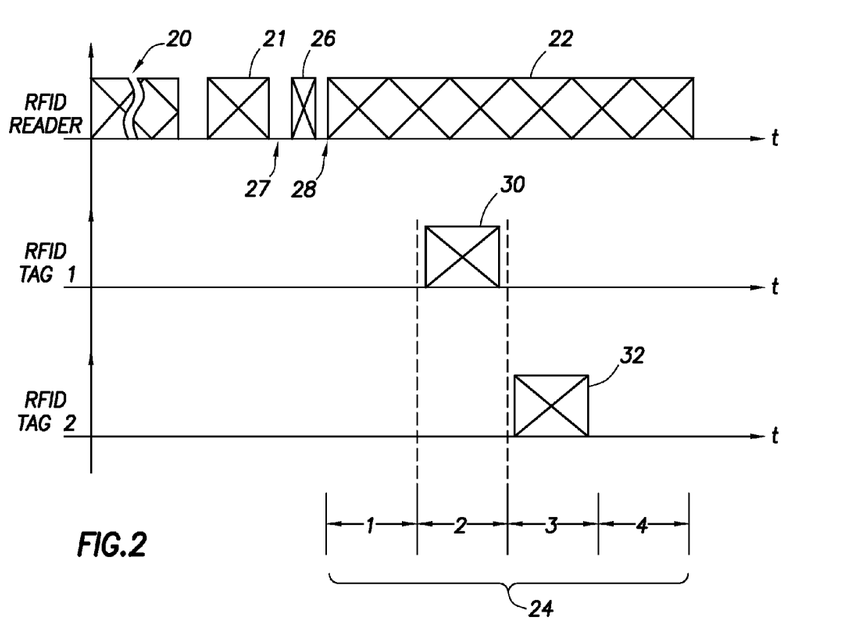
FIG. 2 shows a timing diagram in accordance with at least some embodiments.

Referring to the timing diagrams of FIG. 2, consider as an example a situation where two RFID tags exist within communication range of a RFID reader. The RFID reader in accordance with the various embodiments broadcasts a continuous wave electromagnetic signal 20 (hereafter just continuous wave signal 20) which wakes and possibly powers the illustrative two RFID tags. In embodiments where the number of possible time windows is predetermined, after receiving the continuous wave signal 20 from the RFID reader, each RFID tag generates a random number (between one and four in this example) indicative of a time window in which the respective RFID tag is to transmit. In other embodiments, the number of possible time windows (i.e., the size of the random number generator space) is selectable by the RFID reader during each reading session. In these embodiments, the RFID reader is configured to transmit, for example by signal 21, to the RFID tags a value indicative of the number of possible time windows. In some embodiments, the RFID reader 12 transmits the exact number of time windows (e.g. four in the illustration of FIG. 2), and in other embodiments the RFID reader transmits a bit value indicating the number of bits of the random number space (e.g. two in the illustration of FIG. 2). Regardless of whether the number of windows is predetermined or selected by the RFID reader, further consider that, after random number generation, a first RFID tag selects a first time window value and the second RFID tag selects a second time window.

In some embodiments, the width of each time window is the same and is predetermined, and thus other than receiving an indication of a start time from which to calculate the time windows (discussed more below), no further information is needed. In other embodiments, the RFID reader may set the width of each time window (with each width being the same). Thus, in accordance with at least some embodiments the RFID reader sends a width signal, the width signal indicative of width of each time window. In the illustrative embodiments of FIG. 2, the width signal is encoded in a preamble signal 26, or encoded in proximate signal transitions. For example, the width signal may be encoded in the time width of the preamble signal 26 itself, the time width of the absence of signal (i.e., time period 27) between the preamble signal 26 and signal 21 (or the continuous wave signal 20 if the signal 21 is not used), or the overall time width between transitioning off of the signal 21 (or signal 20) and transitioning on of the continuous wave signal 22.

Regardless of whether the window width is predetermined or set for each reading session by the RFID reader, a beginning time from which each RFID tag calculates its time window is based on a start signal from the RFID reader. In the illustrative embodiments of FIG. 2, and with the RFID tags being passive tags, the start signal takes the form of a cycling (i.e., turning on and off) of the continuous wave signal. In particular, since passive RFID tags transmit messages in the form of backscattered electromagnetic waves, the RFID reader transmits a continuous wave signal 22 during the illustrative time windows 24. The start signal in these circumstances is in the form of a cycling of the continuous wave signal, as illustrated by preamble signal 26, with the start time delineated by the start of the continuous wave signal 22 (point 28). Thus, in some embodiments the preamble performs at least two functions, acting both to encode the width signal and as part of the cycling to indicate the start signal.

In the illustration of the FIG. 2, neither of the RFID tags selected the first time window, and thus neither RFID tag transmits during first time window. During the second time window, and without further specific command from the RFID reader, the first RFID tag transmits, as indicated by signal block 30. During the third time window, the second RFID tag transmits its data, as indicated by the signal block 32. RFID reader 12 and/or electronic system 10 may not know how many RFID tags reside within communication range of the RFID reader, and an RFID tag may respond within any of the possible time windows. Thus, in accordance with the various embodiments using passive tags the RFID reader continues to broadcast the continuous wave signal 22 through and including the last time window.

In some embodiments, a RFID tag may begin transmission immediately at the beginning of the time window, with the width of each time window selected to ensure that all the data payload of a tag may be transmitted, and with some time within the time window added to ensure the transmission does not continue into an adjacent time window. In other embodiments, and as illustrated, each RFID tag may wait a predetermined amount of time after the start of the time window before transmitting. Further, in some embodiments, RFID tags transmit all the data payload in their tag memory (e.g. electronic product code, user defined data and/or kill passwords), but in other embodiments only a portion may be transmitted.

Figure 3:
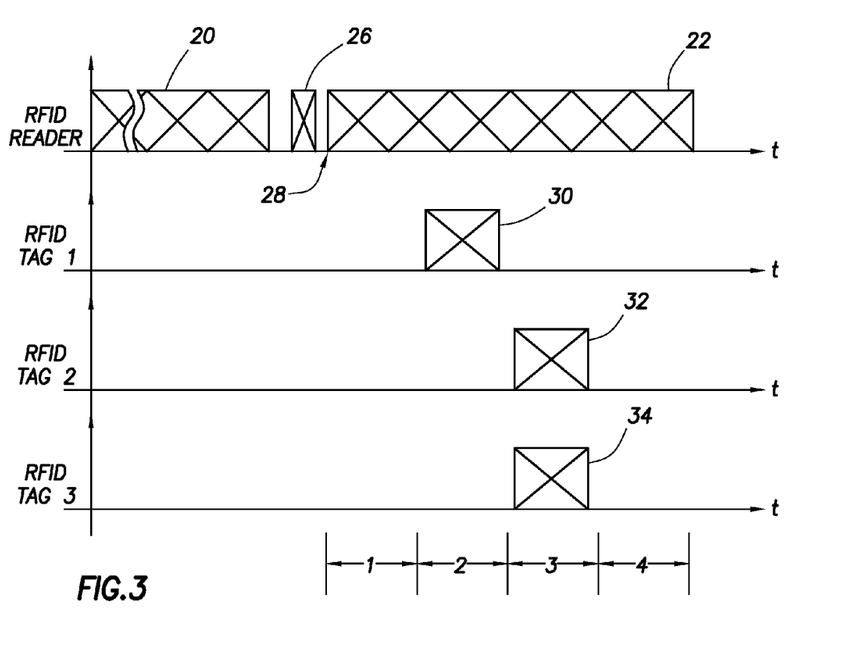
FIG. 3 shows a timing diagram in accordance with at least some embodiments.

In the illustrative case of FIG. 2, the two RFID tags randomly selected different time windows from the illustrative four possible time windows; however, because of the random selection it is possible that two (or more) RFID tags select and transmit in the same time window. Referring to FIG. 3, now consider a situation where three RFID tags exist within communication range of the RFID reader and that it is predetermined that four time windows exist for communication (hence the absence of signal 21 indicating the number of time windows). The RFID reader in accordance with the various embodiments broadcasts continuous wave signal 20 which wakes the illustrative three RFID tags. Upon receiving the wake signal from the RFID reader, each RFID tag generates a random number indicative of a time window in which the respective RFID tag is to transmit. Further consider that, after random number generation, a first RFID tag selects a second time window and that both the second and third RFID tags select the third time window.

In the illustration of the FIG. 3, none of the RFID tags selected the first time window. During the second time window, however, the first RFID tag transmits, as indicated by signal block 30. Thus, electronic system 10 and/or RFID reader 12 determine the presence of the first RFID tag. During the third time window, the second RFID tag transmits its data, as indicated by the signal block 32, and the third RFID tag transmits its data, as indicated by the signal block 34. In accordance with various embodiments, each RFID tag transmits not only some or all its data payload, but each RFID tag also transmits error detection and/or correction codes (such as Cyclic Redundancy Codes (CRC) and/or Viterbi Forward Error Correction (VFEC)). The RFID reader 12 and/or the electronic system 10 determine whether errors occurred in the transmission using the CRC and/or VFEC codes. If no errors occurred, or if corrected errors occurred, then the electronic system 10 and/or RFID reader 12 assume that the transmission was from a single RFID tag without error or with correctable error. If, however, an error is detected and/or the error is uncorrectable in spite of the VFEC, an error occurred in the transmission. In the case of both the second and third RFID tags transmitting in the third time window, it is highly unlikely that the CRC codes received by the RFID reader in the third time window will match the data and/or that data will be correctable with the VFEC (if the transmission can be decoded at all), and thus the electronic system 10 and/or the RFID reader 12 determine that at least one other RFID tag exists in communication range, but that an error occurred.

Figure 4:
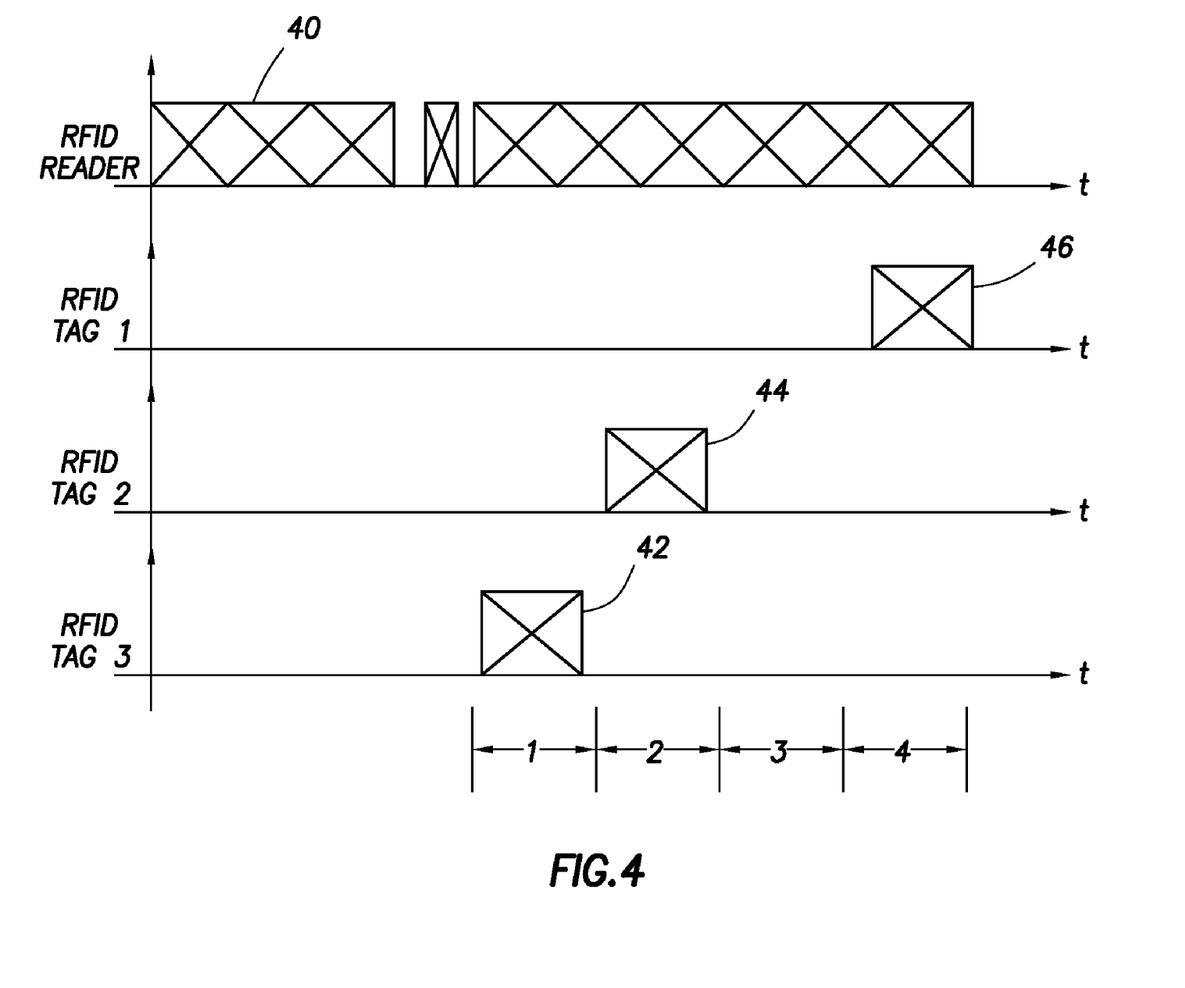
FIG. 4 shows a timing diagram in accordance with at least some embodiments.

In accordance with at least some embodiments, when the electronic system 10 and/or RFID reader 12 determine that additional tags may be present but that communication during previous reading sessions do not fully identify those tags, the system 1000 repeats the process of waking and receiving signals. FIG. 4 shows a timing diagram for a second reading session of the three RFID tags discussed with respect to FIG. 3. The RFID reader broadcasts an electromagnetic signal 40 which again wakes the illustrative three RFID tags. Consider that in the second reading session the first RFID tag selects the fourth time window, the second RFID tag selects the third time window and the third RFID tag selects the first time window. During the first time window the third RFID tag transmits, as indicated by signal block 42. Thus, electronic system 10 and/or RFID reader 12 determine the presence of the third RFID tag. During the second time window, the second RFID tag transmits its data, as indicated by the signal block 44, and the electronic system 10 and/or RFID reader 12 determine the presence of the second RFID tag. During the fourth time window, the first RFID tag transmits its data, as indicated by the signal block 46. In the situation illustrated by FIG. 4, the electronic system 10 and/or RFID reader 12 establish the presences of the second and third RFID tags, and verify again the presence of the first RFID tag. Thus, in spite of two tags randomly selecting the same window, using an illustrative two reading sessions the entire tag population is discovered.

The illustrations above are based on a limited number of RFID tags and a limited number of time windows in order to illustrate operation of the various embodiments; however, there may be a significant number of RFID tags in communication range (e.g. 100 or more in an illustrative grocery store checkout situation, or thousands in a store-wide electronic inventory), and there may be thousands of potential time windows. In other applications, there may be only a few time windows to enable rapid reading sessions. Statistically, for a given number of tags in communication range (i.e., a tag population) and a given number of possible time windows within which RFID tags may transmit, the probability of each RFID tag uniquely selecting a time window takes the form:

$$P_{N,M} = (N!/(N-M)!)/N^M \tag{1}$$

where $P_{M,N}$ is the probability of each RFID tag uniquely selecting a time window, M is the number of tags in the tag population, N is the number of possible time windows (which may be alternatively referred to as the size of the random number generation space), and for M<=N.

Consider again the illustrative situation with three RFID tags (M=3) and four time windows (N=4) (FIGS. 3 and 4). Using the equation (1) above, the probability of each RFID tag uniquely selecting a time window is 0.375. Stated otherwise, 37.5% of the time in situations with three RFID tags and four time windows, only a single reading session will reveal the identities of all three RFID tags. In the event a first session fails to identify all the RFID tags (e.g. as determined by collided transmissions), subsequent reading sessions may reveal the remaining RFID tags.

Equation (1) defines the probability of each RFID tag uniquely selecting a time window for any size RFID tag population and for any number of time windows. However, the size of the factorials renders difficult actual calculation of the probability for large values of N and M (e.g., N=512 and a significant number of RFID tags). Monte Carlo simulations confirm the validity of equation (1) above for small RFID tag populations, and also determine probabilities for larger RFID tag populations and larger numbers of time windows. In particular, Monte Carlo simulations (using MATLAB®) for the illustrative case of three RFID tags (M=3) and four time windows (N=4) were run. For 10,000 runs, the number of runs where each RFID tag uniquely selects a time window was 3,795, confirming the probability of 0.3795 or a 37.95% chance that each RFID tag uniquely selects a time window. Monte Carlo simulations where also run for larger numbers of time windows (N=512) and larger number of RFID tags (M=16). In 1,000 runs with N=512 and M=16, the number of runs where each RFID tag uniquely selects a time window was 793. Stated otherwise, for 512 time windows and 16 RFID tags, there is a 79.3% chance that each RFID tag uniquely selects a time window.

While the probability of each RFID tag uniquely selecting a time window may be high in some situations, the chances of a collision between two or more RFID tags within a particular time window are non-trivial. Thus, in order to discover the identity of all the RFID tags in the tag population, multiple reading sessions may be used. Consider a situation where the number of RFID tags is half the number of time windows (e.g., M=8 and N=16). In such a situation, according to Monte Carlo analysis there is a 12.9% chance that each RFID tag uniquely selects a time window in each reading session. Again, using Monte Carlo an analysis was made to determine the number of reading sessions to identify all the RFID tags. For 10,000 runs (where, in this case, each run is one or more reading sessions performed until all the RFID tags are identified), the mean number of reading sessions needed to identify all the RFID tags was 2.984 with a standard deviation of 1.37. In other words for eight RFID tags and 16 possible time slots, on average 2.984 reading sessions are used to uniquely identify the RFID tags. Of course, in some cases a single reading session may suffice (12.9% of the time), and in other cases more than three reading sessions are used, but on average 2.984 reading sessions are used.

Although the discussion to this point has assumed that the number of RFID tags is less than the number of time windows, such a constraint is not required. Considering the random time window selection aspects of the various embodiments with the fact that multiple reading sessions may be used, the various embodiments are operational in systems where the number of RFID tags exceeds the number of time windows (i.e., where M>N, though equation (1) is not valid in such a domain). In situations where the RFID tags are passive tags, and thus powered by the continuous wave signal, there is no battery-drain penalty for multiple reading sessions.

Consider a situation where the number of RFID tags is greater than the number of time windows by 20% (e.g., M=5 and N=4). It is not possible for each RFID tag to uniquely select a time window; however, within any particular reading session it is possible that only one RFID tag selects a particular time window, and thus with multiple reading sessions all the RFID tags may be identified. Again using Monte Carlo analysis, an analysis was made to determine the number of reading sessions to identify all the RFID tags in situations where M=5 and N=4. For 10,000 runs (where, in this case, each run is two or more reading sessions performed until all the RFID tags are identified), the mean number of reading sessions needed to identify all the RFID tags was 6.57 with a standard deviation of 3.13. In other words, for five RFID tags and 4 possible time slots, on average 6.57 reading sessions are used to uniquely identify the RFID tags. Of course, in some cases only two reading sessions may suffice, and in other cases more than seven reading sessions are used, but on average 6.57 reading sessions are used.

As a further example of more RFID tags than time windows, consider a situation of 14 RFID tags and four time windows. Again, using Monte Carlo an analysis was made to determine the number of reading sessions to identify all the RFID tags in situations where M=14 and N=4. For 1000 runs (where, in this case, each run is two or more reading sessions performed until all the RFID tags are identified), the mean number of reading sessions needed to identify all the RFID tags was 137 with a standard deviation of 52.8.

Figure 5:
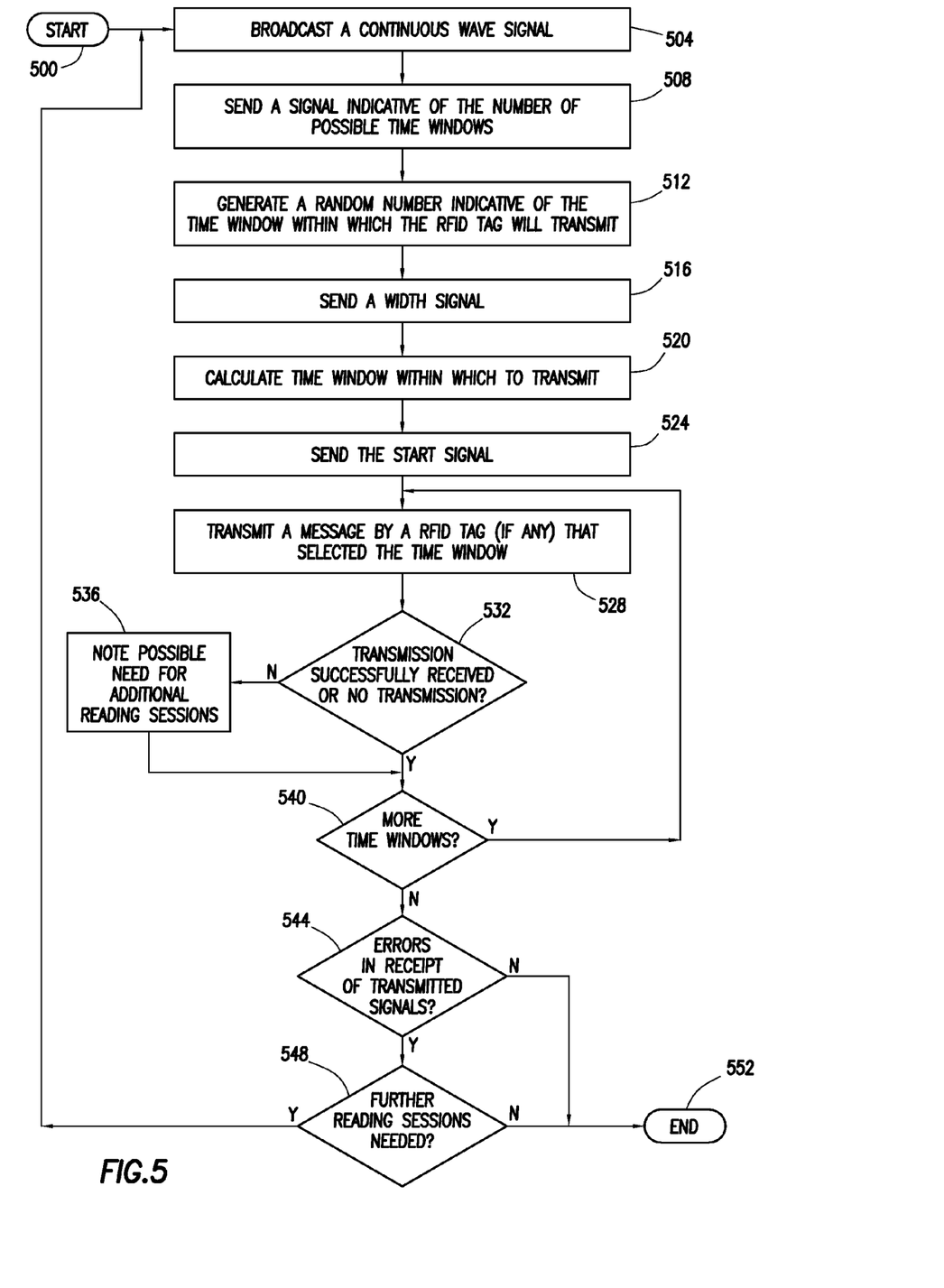
FIG. 5 shows a method in accordance with at least some embodiments.

FIG. 5 illustrates a method in accordance with at least some embodiments. Some of the actions are performed by a reader and other actions are performed by a RFID tag. Further, the order may be varied as desired. In particular, the method starts (block 500) and proceeds to broadcasting a continuous wave signal (block 504). In embodiments using semi-active and passive tags the continuous wave signal wakes the RFID tags in communication range, and in the case of passive RFID tags powers the tags. In embodiments using active tags, broadcasting the continuous wave signal may be omitted. Thereafter, the RFID reader sends a signal indicative of the number of possible time windows (block 508). In some embodiments, the RFID reader sends the actual number (e.g. 1024), and in other embodiments the RFID reader sends a coded indication of the number of possible time windows (e.g. bit width of the random number generator space). In embodiments where the number of possible time windows is predetermined, sending the signal indicative of the number of possible time windows may be omitted.

In response to the continuous wave signal (and when used the signal indicative of the number of possible time windows), each RFID tag generates a random number indicative of the time window within which the RFID tag will transmit (block 512). The time window may be alternatively referred to as a randomly selected period of time. The RFID circuit 18 of each RFID tag 16 comprises a circuit (e.g. hardware, or a combination of hardware and software) that generates the random number. Random number generation in some cases may not be truly random; however, for purposes of this specification and in the claims, a pseudo-random number generation (whether in hardware or software) shall be considered random number generation.

Thereafter, the RFID reader sends a width signal (block 516), the width signal indicative of a time width of each time window. The width signal may take any suitable form. For example, the width signal may be encoded in the time width of preamble 26 signal, encoded in the width of a period of time between cycling-off of the continuous wave signal 20 (or signal 21) and cycling-on of the preamble 26, or encoded in the width of the period time between cycling-off of the continuous wave signal 20 (or signal 21) and cycling-on of the continuous wave signal 22. In embodiments where the width of each time window is predetermined, sending of the width signal may be omitted. Using the random number and width signal (if used), each RFID tag determines its time window within which to transmit (block 520). For example, if the width of each time window is 10 milli-seconds, and a particular RFID tag generates a random number of 20, the particular RFID tag determines its time window to be the period of time between 200 and 210 milli-seconds after the start signal. The next step in the illustrative method is for the RFID reader to send the start signal (block 524). In embodiments using passive tags, the start signal may be cycling-on of the continuous wave signal 22 used to power the tags. In other embodiments, the start signal may take any suitable form.

With the start signal signifying the beginning of the first time period, the RFID reader transitions to a "listening" mode (even if that "listening" is in addition to broadcasting continuous wave signal 22). Within each time window, the illustrative method moves to transmitting a message by a RFID tag (if any) that selected the time window (block 528). The transmitting by the RFID tag may take many forms. In some embodiments, when a selected time window arrives, the RFID tag transmits its entire data payload (e.g. an electronic product code and user specific data in the tag memory 20). In other embodiments, only a portion of the data payload of the RFID tag is transmitted (e.g., just the electronic product code). The electronic system 10 and/or the RFID reader 12 determines whether a transmission from a single RFID tag was successfully received within the time window, or if no RFID tag transmitted in the time window (block 532). Determining whether a single RFID tag successfully transmitted in the time window may involve calculating a CRC code for the received data, and comparing the CRC code calculated to that received by the RFID reader. If the CRC codes do not match, either an error occurred in the transmission from a single tag, or multiple RFID tags attempted to transmit during the time window. In the case of an error, a notation is made as to the possible need to have an additional reading session (block 536).

Next, the illustrative method moves to a determination of whether more time windows exist (block 540). Because in most situations it is envisioned that there will be more time windows than RFID tags, and because there is an equal probability that any particular RFID tag will select the last time window or the first time window, the RFID reader continues listening until the end of the last time window. Thus, if more time windows remain, the illustrative method returns to determining whether a transmission from a single RFID tag was successfully received within the next time window, or if no RFID tag transmitted in the next time window (block 532). If no further time windows remain (again block 540), a determination is made as to whether any errors occurred in receipt of transmitted signals (block 544) (e.g. error in transmission from a single RFID tag, or collided transmissions in a single time window from multiple RFID tags). If no errors occurred in the transmission (i.e., all tags selected unique time windows, and all transmissions were error free), the illustrative method may end (block 552). If errors occurred (again block 544), determination is made as to whether further reading sessions are needed (block 548), and the method ends (block 552).

In some embodiments, the first reading of the RFID tags may reveal all the RFID tags (e.g. the case of two tags in 1024 time windows). However, as the number of tags approaches (or exceeds) the number of possible time windows, the chances of every RFID tag in the population selecting a unique time window diminishes (or is not possible), and multiple reading sessions may be used. The multiple reading sessions need not be attempts to reach the ideal of each RFID tag selecting a unique time window (although if it happens, no further reading sessions are needed); rather, in subsequent reading sessions RFID tags that were not read previously (i.e., because of transmission errors or collisions with transmission by multiple RFID tags) may be identified, and the existence of previously read RFID tags may be verified. It may be that the ideal of each RFID tag selecting a unique time window is not met in multiple reading sessions, but through the multiple reading sessions all the RFID tags are identified. After the first reading session, a determination of whether errors occurred is the impetus for instituting another reading sessions. After two reading sessions, however, the determination as to whether to institute another reading sessions is based on the confidence of the electronic system 10 and/or RFID reader 12 that all the tags have been identified (even if errors occurred in the last reading session).

In the United States, the Federal Communication Commission (FCC) requires that RFID systems use a frequency hopping scheme to reduce interference with other devices operating the in the same band. In particular, RFID systems in the United States are not allowed to stay at any one center frequency for more than 0.4 seconds within a 30 second period. Thus, in situations where subsequent reading session are needed or desired, the subsequent reading session need not take place at the same center frequency.

Figure 6:
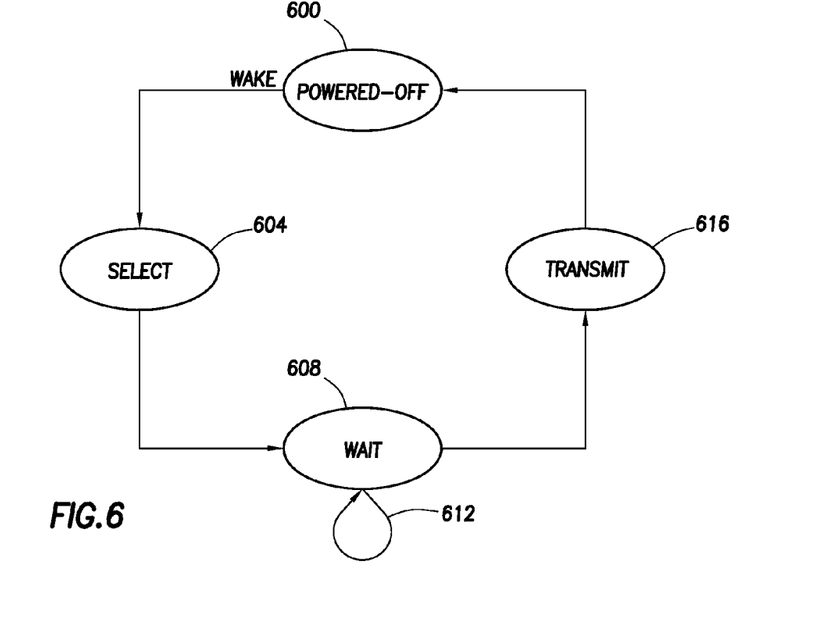
FIG. 6 shows a state diagram for a RFID circuit in accordance with at least some embodiments.

FIG. 6 illustrates a state diagram for a RFID circuit in accordance with at least some embodiments. In particular, the RFID circuit begins in a powered-off state 600. Upon receiving a wake signal from the RFID reader, the RFID circuit transitions to select state (604). In the select state, the RFID circuit randomly selects a time window within which to transmit (e.g. by generating a random number, and selecting the time window based on the random number). After the time window is selected, the RFID circuit transitions into a wait state 608. The RFID circuit remains in the wait state (loop 612) until the RFID circuit internally determines that the selected time window has arrived. When the selected time window arrives, and without input from the RFID reader, the RFID circuit transitions to a transmit state. In the transmit state, the RFID circuit transmits some or all the data payload stored in memory of the RFID circuit. After transmission, the RFID circuit transitions to the powered-off state (block 600).

As a further example, consider a situation of a system, such as system 1000 of FIG. 1, operating in range of frequencies from 5.725-5.850 Giga-Hertz (GHz). In the United States FCC regulations dictate that each channel in the 5.725-5.850 GHz range of frequencies have a 20 dB bandwidth of 1 Mega-Hertz, and that occupancy time for each channel be no greater than 400 milli-Seconds (mS). Useful bandwidth in a channel is approximately half the maximum bandwidth, meaning that the useful bandwidth for this example is about 500 Kilo-Hertz (KHz). With the data symbol period approximated to be roughly twice the period of the highest frequency, the data rate for this example is selected to be 200 KHz. Further consider that the data payload consists of an electronic product code comprising 96 bits, and a CRC of 16 bits. At 200 KHz, transmitting 112 bits (96+16) takes approximately 0.56 mS, so with a guard band the width of each time window is selected to be 0.6 mS. If the system can only stay on one channel for 400 mS, the maximum number of contiguous time windows is 733 (400/0.6). A random number generator of 10 bits yields random number space having 1024 possible values (too many for our calculated maximum number of time windows), thus for this example the random number space is constrained to 9 bits or 528 possible values. For passive tags then, the RFID reader radiates power for a reading session spanning 318 mS (528 time windows times 0.6 mS per time window), well within FCC limitation.

However, in situations where multiple reading session are used, those reading sessions need not span different center frequencies if the number of time windows is sufficiently small. For example, in the illustrative situation above having 14 RFID tags and four time windows, with a time window width of 0.6 mS each reading session spans approximately 2.4 mS (four time windows times 0.6 mS per time window). For the average number of reading sessions to identify all the RFID tags in this particular situation of 137, the total time to run the average 137 reading sessions is 329 mS—less than the 400 mS maximum allowed for one frequency hop.

It should be understood that the systems, RFID readers and RFID tags of the various embodiments do not necessarily operate faster (i.e., read all the tags in communication range) than other systems; however, the reduced number of interactions between the components reduces the complexity of the RFID reader and RFID tag with respect to more complex systems, making the RFID readers and particularly the RFID tags less expensive to design and manufacture. Alternatively, the various embodiments may be added to existing systems and protocols, such as the EPCglobal RFID Air Interface standard products.

The above discussion is meant to be illustrative of the principles and various embodiments of the present invention. Numerous variations and modifications will become apparent to those skilled in the art once the above disclosure is fully appreciated. For example, the RFID tags and corresponding RFID circuits have been discussed only in relation to reading the RFID tags; however, RFID tags may also have the ability to be written by the RFID reader, and thus the various embodiments should not be read as limiting such an ability. Moreover, the "data payload" of an RFID circuit is not limited to data placed during manufacture and/or written by the RFID reader; rather, the data payload may come from many sources. For example, upon power-up the RFID tag may read an attached sensor and place sensor data in the user defined data area of the tag memory 20. Further still, while the tag antennas 17 are shown separate from the RFID circuits 18, the tag antennas and RFID circuits may be co-located on the same substrate. Furthermore, the ability of RFID tags and RFID readers to interact in the manner disclosed in this specification is not necessarily mutually exclusive with other forms of interaction; for example, the RFID reader may interact with RFID tags that selectively operate both under the systems and methods disclosed in this specification, and the illustrative EPCglobal RFID Air Interface. In particular, the RFID reader may issue a command that sets the interface protocol used by each RFID tag, and then interact with the tags under the selected protocol. It is intended that the following claims be interpreted to embrace all such variations and modifications.

What is claimed is:

1. A method comprising:
   (a) selecting, by each of a plurality of radio frequency identification (RFID) tags, a time window within which to transmit;
   (b) sending a start signal from a RFID reader to the RFID tags, the start signal indicative of the start of a first time window;
   (c) transmitting a signal, by each of the RFID tags, in the respective time windows without receiving input from the RFID reader, wherein at least two RFID tags transmit the signal in the same time window;
   (d) for each of the RFID tags that transmitted the signal during the same time window, selecting a new time window and retransmitting the signal without receiving input from the RFID reader; and
   (e) repeating step (d) until none of the RFID tags transmit the signal in the same time window.

2. The method according to claim 1 wherein selecting further comprises, for each of the RFID tags:
   generating a random number; and
   selecting a time window based on the random number.

3. The method according to claim 2 wherein selecting the time window further comprises selecting the time window directly indicated by the random number.

4. The method according to claim 1 further comprising:
   determining whether the at least two of the RFID tags transmitted the signal within the same window.

5. The method according to claim 4 wherein determining further comprises receiving a signal in a time window where error detection bits indicate invalid data.

6. The method according to claim 4 wherein determining further comprises receiving a signal in a time window where error correction bits received are insufficient to correct data errors.

7. The method according to claim 4 wherein repeating further comprises transmitting at a center frequency different than a center frequency used in the initial transmitting.

8. The method according to claim 1 further comprising broadcasting a wake signal from the RFID reader to the RFID tags.

9. The method according to claim 8 wherein broadcasting further comprises broadcasting a continuous wave electromagnetic signal to provide power to the plurality of RFID tags.

10. The method according to claim 9 wherein sending the start signal is performed by cycling the continuous wave electromagnetic signal.

11. The method according to claim 1 further comprising, prior to selecting the time windows, sending a signal by the RFID reader to set an interaction mode.

12. The method according to claim 1 further comprising sending a width signal by the RFID reader to the RFID tags, the width signal indicative of a time width of each time window.

13. A radio frequency identification (RFID) tag comprising:
a tag antenna; and
a first RFID circuit coupled to the tag antenna;
wherein the first RFID circuit is configured to transmit a first message to a RFID reader, transmission of the first message beginning at a particular time selected at random by the RFID tag without input from the RFID reader;
wherein the first message is transmitted at a same particular time as a second message transmitted by a second RFID tag within a detection range of the RFID reader,
wherein a different particular time to retransmit the first and second messages is selected such that the first RFID tag and the second RFID tag do not retransmit the corresponding message at the same particular time, the retransmission occurring without input from the RFID reader.

14. The RFID tag according to claim 13 wherein the first RFID circuit, responsive to a signal from the RFID reader, is configured to generate a random number, the random number used to identify the particular time.

15. The RFID tag according to claim 13 further comprising:
a memory within the first RFID circuit, the memory storing data;
wherein the first RFID circuit is configured to transmit at least a portion of the data at the particular time selected.

16. The RFID tag according to claim 15 wherein the memory stores one or more selected from the group consisting of:
an electronic product code; user defined data; and a kill password.

17. The RFID tag according to claim 13 wherein the first RFID circuit is configured to receive a signal from the RFID reader indicative of a start time, and the particular time is a time after receipt of the signal.

18. The RFID tag according to claim 13 wherein operating power for the first RFID circuit is derived from one or more selected from the group consisting of:
an internal battery; and
power received from the RFID reader circuit.

19. The RFID tag according to claim 13 wherein the RFID tag transmits by backscattering electromagnetic signals.

20. A system comprising:
a reading antenna; and
a radio frequency identification (RFID) reader coupled to the reading antenna;
wherein the RFID reader is configured to simultaneously activate a plurality of RFID tags, and the RFID reader is configured to receive responses from all of the RFID tags without further communication to the RFID tags from the RFID reader, each RFID tag response being sent at a time window;
wherein at least two RFID tag responses are sent at the same time window; and
wherein different time windows are selected for the RFID tags that sent responses at the same time window and the responses are resent without receiving input from the RFID reader such that none of the responses are sent at the same time window.

21. The system according to claim 20 wherein when the RFID reader activates the RFID tags, the RFID reader sends a timing signal indicative of a first period of time in which a response can be received.

22. The system according to claim 20 wherein when the RFID reader activates the RFID tags, the RFID reader broadcasts a continuous wave electromagnetic signal.

23. The system according to claim 20 wherein when the RFID reader receives the RFID tag responses, the RFID reader broadcasts a continuous wave electromagnetic signal and receives responses as backscattered electromagnetic waves.

24. The system according to claim 20 wherein the system is further configured to determine whether any of the responses from the RFID tags are ambiguous, and if any of the responses are ambiguous, the RFID reader is further configured to again simultaneously activate the RFID tags.

25. The system according to claim 24 further comprising an electronic system coupled to the RFID reader, and wherein the electronic system determines whether unambiguous responses were received from each of the RFID tags.

26. The system according to claim 24 wherein when the system determines whether unambiguous responses were received, the system determines whether cyclic redundancy check (CRC) codes for each response match data of each response.

* * * * *